United States Patent
Coppin et al.

(10) Patent No.: US 10,839,310 B2
(45) Date of Patent: Nov. 17, 2020

(54) SELECTING CONTENT ITEMS USING REINFORCEMENT LEARNING

(71) Applicant: Google LLC, Mountain View, CA (US)

(72) Inventors: Benjamin Kenneth Coppin, Cottenham (GB); Mustafa Suleyman, London (GB); Thomas Chadwick Walters, Bromley (GB); Timothy Mann, Harpenden (GB); Chia-Yueh Carlton Chu, London (GB); Martin Szummer, London (GB); Luis Carlos Cobo Rus, San Francisco, CA (US); Jean-Francois Crespo, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 904 days.

(21) Appl. No.: 15/212,037

(22) Filed: Jul. 15, 2016

(65) Prior Publication Data
US 2018/0018580 A1    Jan. 18, 2018

(51) Int. Cl.
*G06N 20/00*   (2019.01)
*G06F 16/9535*   (2019.01)
(Continued)

(52) U.S. Cl.
CPC ....... *G06N 20/00* (2019.01); *G06F 16/24578* (2019.01); *G06F 16/9535* (2019.01);
(Continued)

(58) Field of Classification Search
CPC .................................................. G06F 16/9535
See application file for complete search history.

(56) References Cited

U.S. PATENT DOCUMENTS 9,235,804 B1    1/2016   Bieniasz-Krzywiec et al.
9,258,606 B1    2/2016   Collins et al.
(Continued)

FOREIGN PATENT DOCUMENTS

WO    2015/143096    9/2015
WO    2016/109755    7/2016

OTHER PUBLICATIONS

International Search Report and Written Opinion issued in International Application No. PCT/US2017/042238, dated Nov. 6, 2017, 10 pages.
(Continued)

*Primary Examiner* — Miranda M Huang
*Assistant Examiner* — Seth Andrew Raker
(74) *Attorney, Agent, or Firm* — Fish & Richardson P.C.

(57) ABSTRACT

Methods, systems, and apparatus, including computer programs encoded on computer storage media, for using a machine learning model that has been trained through reinforcement learning to select a content item. One of the methods includes receiving first data characterizing a first context in which a first content item may be presented to a first user in a presentation environment; and providing the first data as input to a long-term engagement machine learning model, the model having been trained through reinforcement learning to: receive a plurality of inputs, and process each of the plurality of inputs to generate a respective engagement score for each input that represents a predicted, time-adjusted total number of selections by the respective user of future content items presented to the respective user in the presentation environment if the respective content item is presented in the respective context.

18 Claims, 4 Drawing Sheets

(51) Int. Cl.
*G06F 16/2457* (2019.01)
*G06N 3/08* (2006.01)
*G06N 3/04* (2006.01)
*G06N 7/00* (2006.01)

(52) U.S. Cl.
CPC .......... *G06N 3/0445* (2013.01); *G06N 3/084* (2013.01); *G06N 7/005* (2013.01)

(56) References Cited

U.S. PATENT DOCUMENTS

| | | | |
|---|---|---|---|
| 9,373,088 B2 | 6/2016 | Nuyujukian et al. | |
| 2006/0004680 A1 | 1/2006 | Robarts et al. | |
| 2006/0224535 A1 | 10/2006 | Chickering | |
| 2013/0198122 A1 | 8/2013 | Baughman et al. | |
| 2014/0156681 A1* | 6/2014 | Lee | G06F 16/9535 707/754 |
| 2014/0272847 A1 | 9/2014 | Grimes et al. | |
| 2014/0278308 A1 | 9/2014 | Liu et al. | |
| 2015/0100530 A1 | 4/2015 | Mnih et al. | |
| 2015/0121246 A1 | 4/2015 | Poore et al. | |
| 2015/0178790 A1 | 6/2015 | Yi et al. | |
| 2015/0213361 A1* | 7/2015 | Gamon | G06N 20/00 706/12 |
| 2015/0333986 A1 | 11/2015 | Pang et al. | |
| 2016/0267520 A1* | 9/2016 | Kalish | G06Q 30/0242 |
| 2018/0018331 A1* | 1/2018 | Kesamreddy | G06F 16/3322 |

OTHER PUBLICATIONS

Onda et al. "A Reinforcement Learning Model Using Macro-actions in Multi-task Grid-World Problems," Proceedings of the 2009 IEEE International Conference on Systems, Man and Cybernetics, Oct. 11-14, 2009, 6 pages.

Extended European Search Report in European Appln No. 17828572.2, dated Jan. 2, 2020, 8 pages.

* cited by examiner

FIG. 4

SELECTING CONTENT ITEMS USING REINFORCEMENT LEARNING

BACKGROUND

This specification relates to reinforcement learning.

Reinforcement learning agents interact with an environment by receiving an observation that characterizes the current state of the environment, and in response, performing an action from a predetermined set of actions. Some reinforcement learning agents use neural networks to select the action to be performed in response to receiving any given observation.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

In general, this specification describes a system that is configured to determine whether or not to present a content item to a user using a machine learning model that has been trained through reinforcement learning.

A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

Particular embodiments of the subject matter described in this specification can be implemented so as to realize one or more of the following advantages. A system can effectively predict the extent to which presenting a content item in a particular context to a particular user will have negative long-term consequences on the user's future engagement with subsequent content items. Accordingly, the system can determine not to present the current content item if the negative long-term consequences are too great, improving the user experience and maintaining long-term user engagement.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
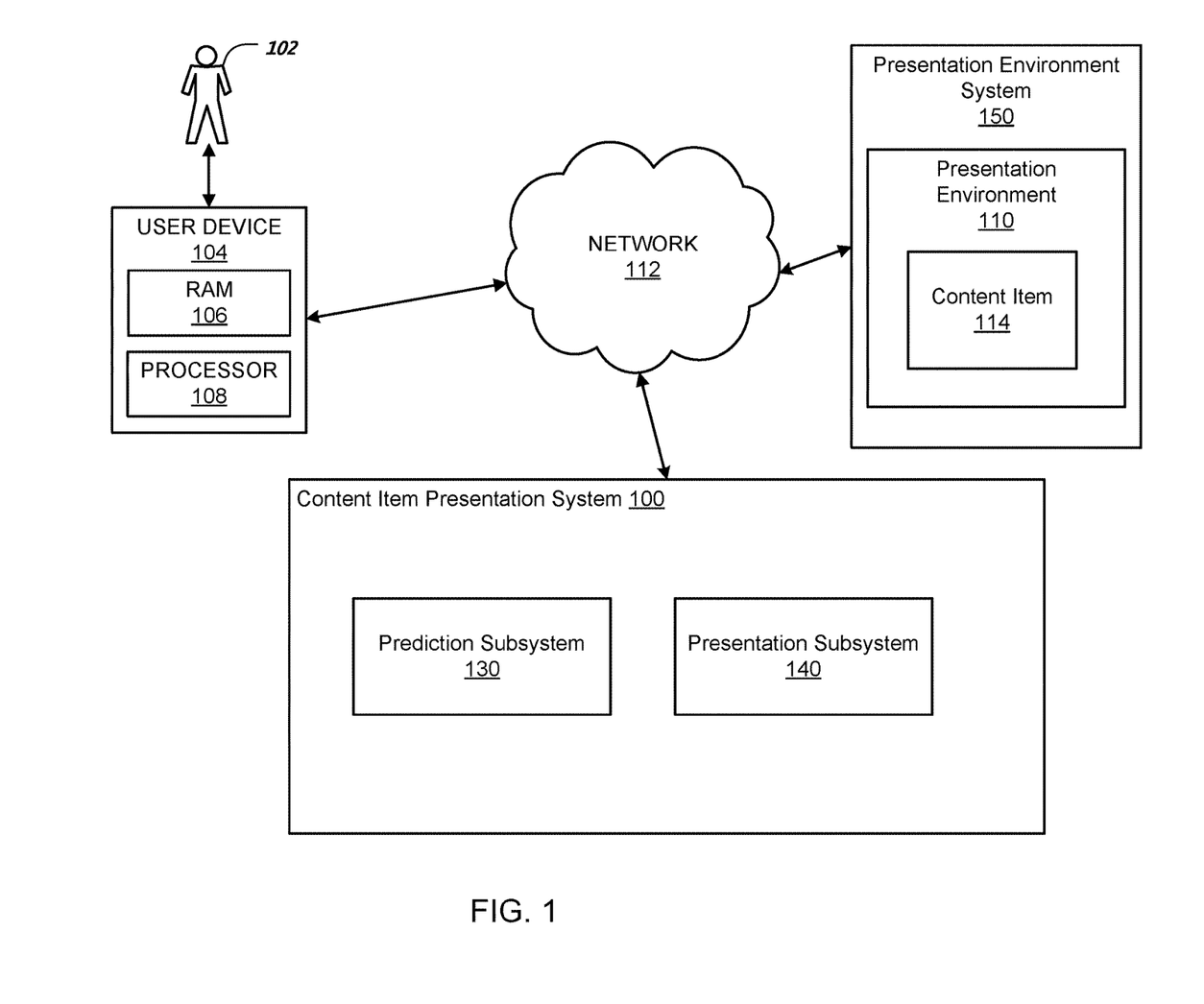
FIG. 1 shows an example content item presentation system.

FIG. 1 shows an example content item presentation system 100.

The content item presentation system 100 is an example of a system implemented as computer programs on one or more computers in one or more locations, in which the systems, components, and techniques described below can be implemented.

The content item presentation system 100 is a system that selects content items for presentation to users in a presentation environment 110.

In particular, the content item presentation system 100 receives data characterizing the current state of the presentation environment 110, i.e., a state in which a content item 114 may be presented to a user 102 on a user device 104, and, in response, determines whether or not present the content item 114 to the user 102 on the user device 104 when the presentation environment 110 is in the current state.

In some implementations, the content items are candidates for presentation in a response to a search query, e.g., as part of a search results web page. That is, the presentation environment 110 is a search query response, e.g., a search results web page, and different states of the presentation 110 correspond to different instances of search query responses, i.e., presentations that are responses to different search queries submitted by various users. In these implementations, the content items may be search results that are candidates for being included in the response or online advertisements that are candidates for being included in the response along with search results.

In some other implementations, the content items are recommendations of content that may be of interest to a user that is currently being presented with a piece of content. That is, the presentation environment 110 is a presentation of a piece of content to a user that includes recommendations of other pieces of content that may be of interest to the user. For example, the presentation environment 110 may be a presentation of a video that includes one or more previews that each identify other videos, e.g., by including a thumbnail from the video and other identifying information for the video and including a link to the video, that may be of interest to the user. As another example, the presentation environment 110 may be a presentation of an image that includes one or more previews that each identify other images, e.g., by including a thumbnail of the image and including a link to the image, that may be of interest to the user.

For example, a user 102 of a user device 104 can submit a request to a presentation environment system 150 over a data communication network 112, e.g., by submitting a search query to an Internet search engine or to a video-sharing website, that triggers content that may include the content item 114 to be presented to the user 102 in the presentation environment 110. As part of generating the response, the presentation environment system 150 can submit a request to the content item presentation system 100 that includes data characterizing the current context of the presentation environment 110.

In response, the content item presentation system 100 determines whether or not to present the content item 114 to the user 102 in the presentation environment 110 using a prediction subsystem 130 and a presentation subsystem 140.

Generally, the prediction subsystem 130 is a long-term engagement machine learning model that has been trained through reinforcement learning to receive model inputs and to generate a predicted output for each received model input. For example, the prediction subsystem 130 may be a linear regression model, a feedforward neural network, a recurrent neural network, or a long short-term memory (LSTM) neural network.

In particular, each model input characterizes a respective context in which a respective content item may be presented to a respective user in the presentation environment 110 and the prediction subsystem 130 has been trained so that the predicted output generated for the model input is an engagement score that measures predicted future user engagement with future content items presented to the respective user in the presentation environment 110 if the respective content item is presented in the respective context. In particular, in some implementations, the engagement score represents a predicted, time-adjusted, e.g., time-discounted, total number of selections by the respective user of future content items presented to the respective user in the presentation environment 110 if the respective content item is presented in the respective context. In some other implementations, the engagement score represents a predicted time-adjusted, e.g., time-discounted, change in a rate with which the respective user selects future content items presented to the respective user in the presentation environment 110 if the respective content item is presented in the respective context.

Training the prediction subsystem 130 to generate engagement scores through reinforcement learning is discussed below with reference to FIG. 4.

The presentation subsystem 140 interacts with the prediction subsystem 130 to determine whether or not to present the content item 114 in the presentation environment 110 using engagement scores generated by the prediction subsystem 130. Determining whether or not to present a content item in the presentation environment 110 using engagement scores is discussed in more detail below with reference to FIGS. 2 and 3.

If the presentation subsystem 140 determines to present the content item 114 in the presentation environment 110, the content item presentation system 100 can transmit the content item 114 for presentation to the user 102 or transmit an indication to the presentation environment system 150 that causes the presentation environment system 150 to provide the content item 114 for presentation the user 102 in the presentation environment 110.

If the content item presentation system 100 determines not to present the content item 114, the content item presentation system 100 refrains from transmitting the content item 114 for presentation to the user 102 or transmits an indication to the presentation environment system 150 that the content item 114 should not be presented to the user 102 in the presentation environment 110.

Figure 2:
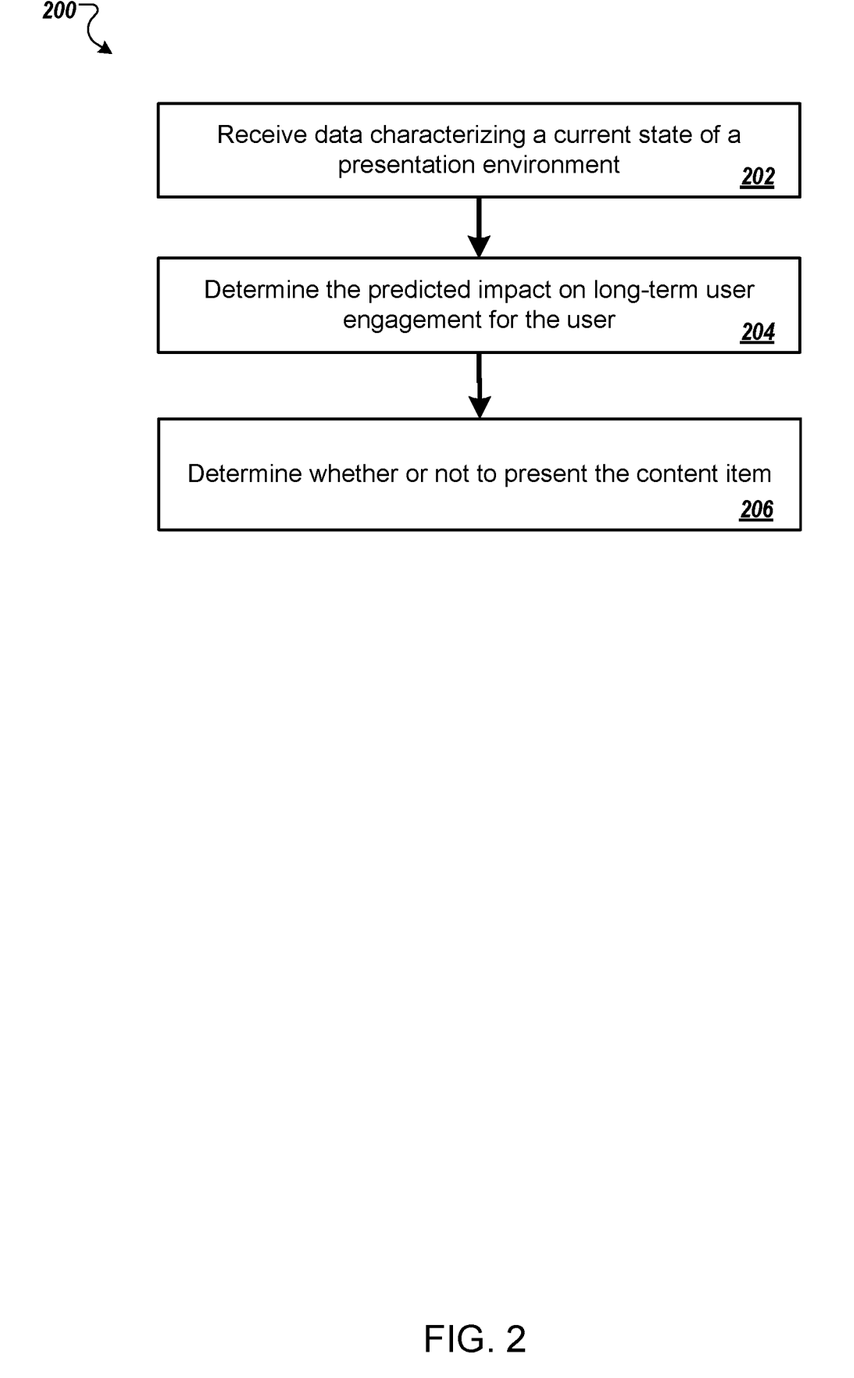
FIG. 2 is a flow diagram of an example process for determining whether or not to present a content item in a presentation setting.

FIG. 2 is a flow diagram of an example process 200 for determining whether or not to present a content item in a presentation setting. For convenience, the process 200 will be described as being performed by a system of one or more computers located in one or more locations. For example, a content item presentation system, e.g., the content item presentation system 100 of FIG. 1, appropriately programmed, can perform the process 200.

The system receives data characterizing a current state of a presentation environment in which a particular content item may potentially be presented to a particular user (step 202). That is, the system receives data characterizing a current context in which the particular content item may potentially be presented to the particular user in the presentation environment.

The data characterizing the current context includes various features characterizing the particular content item.

For example, the data can include a score that represents the quality of the content item as determined by an external system.

As another example, the data can include a score that represents, as determined by an external system, a predicted likelihood that the user will select the content item if it is presented.

As another example, if the presentation environment is a response to a search query submitted by the user, the data can include a score that represents, as determined by the external system, the likelihood that the content item is navigational with respect to the search query. A navigational content item is a content item that is being sought by the search query. That is, the search query is a query that is seeking a single piece of content, and the content item is or identifies the single piece of content being sought.

As another example, if the content item includes a link to a resource, the data can also include a score that represents a quality of the resource linked to by the content item as determined by an external system.

As another example, the data can also include data identifying the current time and date.

As another example, the data can also include data identifying a presentation position of the content item, e.g., where the content item may potentially be presented relative to other content, e.g., other content items or different content, in the presentation environment.

Optionally, the data characterizing the current context can also include various features of content items previously presented to the particular user in the presentation environment. For example, the features can include some or all of the features described above for a predetermined number of context items most recently presented to the particular user in the presentation environment or each context item presented to the particular user in a recent time window. Further optionally, for each previously presented content item, the data can also include data identifying whether or not the particular user selected the content item while it was presented in the presentation environment.

Additionally, when the content item may be presented as part of a response to a search query, the data can optionally include the text of the search query and, further optionally, the text of one or more other search queries that were recently submitted by the particular user.

The system determines the predicted long-term impact on user engagement as a consequence of presenting the particular content item when the presentation environment is in the current state, i.e., of presenting the particular content item in the current context (step 204). In particular, the system determines the predicted long-term impact using a machine learning model that has been trained through reinforcement learning, e.g., the prediction subsystem 130 of FIG. 1. Determining the predicted long-term impact is described in more detail below with reference to FIG. 3.

The system determines whether or not to present the particular content item based on the predicted long-term impact (step 206). Generally, the system determines to present the content item if the predicted long-term impact of presenting the content item is not overly negative. In particular, the system determines to present the content item when the predicted long-term impact exceeds a threshold value.

In some implementations, the system receives data identifying the threshold value from an external system or from a system administrator.

In some other implementations, the system receives data identifying a short-term value that results from presenting the content item to the user and an average value resulting from each future selection of a content item by the user and determines the threshold value from the received data. For example, the threshold value T may satisfy:

$$T=(k-\text{STV})/\text{AV},$$

where k is a constant value, STV is the short-term value that results from presenting the content item to the user, and AV is the average value resulting from each future selection of a content item by the user.

If the system determines to present the content item, the system can transmit the content item for presentation to the user or transmit an indication to an external system that causes the external system to provide the content item for presentation the user in the presentation environment. If the system determines not to present the content item, the system refrains from transmitting the content item for presentation to the user or transmits an indication to the external system that the content item should not be presented to the user.

Figure 3:
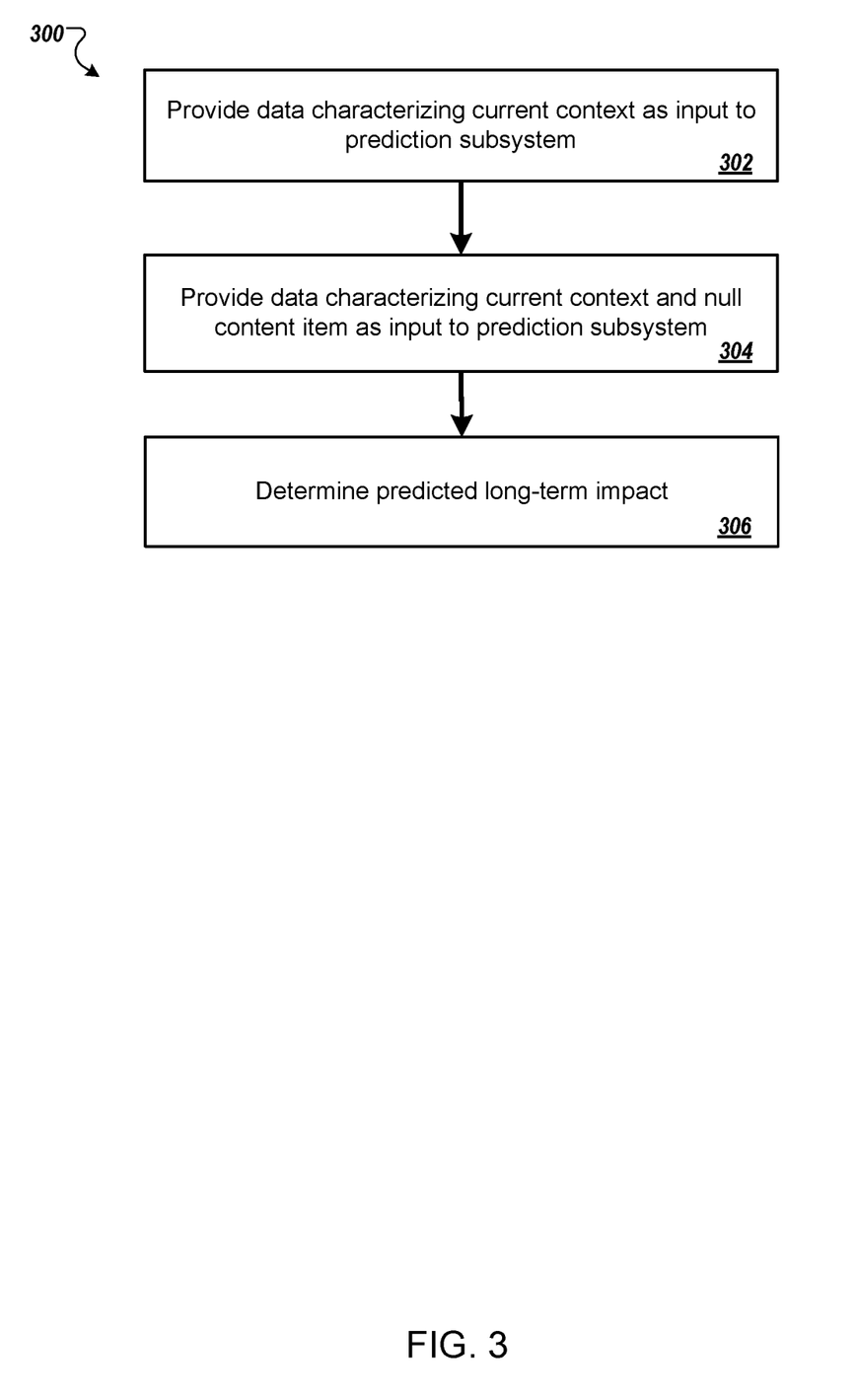
FIG. 3 is a flow diagram of an example process for determining the predicted long-term impact on user engagement as a consequence of presenting the current content item.

FIG. 3 is a flow diagram of an example process 300 for determining the predicted long-term impact on user engagement as a consequence of presenting the current content item. For convenience, the process 300 will be described as being performed by a system of one or more computers located in one or more locations. For example, a content item presentation system, e.g., the content item presentation system 100 of FIG. 1, appropriately programmed, can perform the process 300.

The system provides the data characterizing the current context in which the content item may be presented as input to the prediction subsystem (step 302). The prediction subsystem is a machine learning model that has been trained to process the input to generate a current engagement score that measures predicted future user engagement with future content items presented to the user in the presentation environment if the content item is presented in the current context. In particular, in some implementations, the engagement score represents a predicted, time-adjusted total number of selections by the user of future content items presented to the respective user in the presentation environment if the content item is presented in the current context. In some other implementations, the engagement score represents a predicted time-adjusted change in a rate with which the user selects future content items presented to the user in the presentation environment if the content item is presented in the current context.

The system provides data characterizing the current context and a null content item as input to the prediction subsystem (step 304). That is, the system provides data characterizing the current context, but with data characterizing the null content item in place of the data characterizing the current content item. The data characterizing the null content item is predetermined placeholder data that indicates to the prediction subsystem that no content item is to be presented in the current context.

The prediction subsystem has been trained to treat the data characterizing the current context and the null content item as an indication that no content item is presented to the user in the current context, i.e., that no content item is presented to the presentation environment is in the current state, and to therefore generate a null engagement score that measures predicted future user engagement with future content items presented to the user in the presentation environment if no content item is presented in the current context. In particular, in some implementations, the engagement score represents a predicted, time-adjusted total number of selections by the user of future content items presented to the respective user in the presentation environment if no content item is presented in the current context. In some other implementations, the engagement score represents a predicted time-adjusted change in a rate with which the user selects future content items presented to the user in the presentation environment if no content item is presented in the current context. Training the prediction subsystem to treat data characterizing (i) a context and (ii) a designated null context item as an indication that no content item is presented to the user in the context is described in more detail below with reference to FIG. 4.

The system determines the predicted long-term impact on user engagement as a consequence of presenting the current content item from the current engagement score and the null engagement score (step 306). In particular, the system subtracts the current engagement score from the null engagement score to determine the predicted decrease in user engagement as a result of presenting the current content item. The system may treat the predicted decrease as the predicted long-term impact or may apply a scaling factor to the predicted decrease to generate the predicted long-term impact. In some implementations, if the predicted long-term impact is positive, i.e., is greater than zero, the system sets the impact to zero.

In some implementations, the system performs the process 300 on-line, i.e., when determining whether or not to present a given content item. In some other implementations, the system performs the process 300 offline for multiple possible combinations of content items and contexts and stores data mapping each combination of content item and context to the predicted long-term impact for the combination. In these implementations, when a determination about whether or not to present a given content item is made, the system accesses the maintained data to determine the predicted long-term impact. If a particular content item and context combination is not in the maintained data, the system can estimate the predicted long-term impact based on predicted long-term impacts for neighboring combinations that are in the maintained data, e.g., by averaging the long-term impacts for the neighboring combinations.

Figure 4:
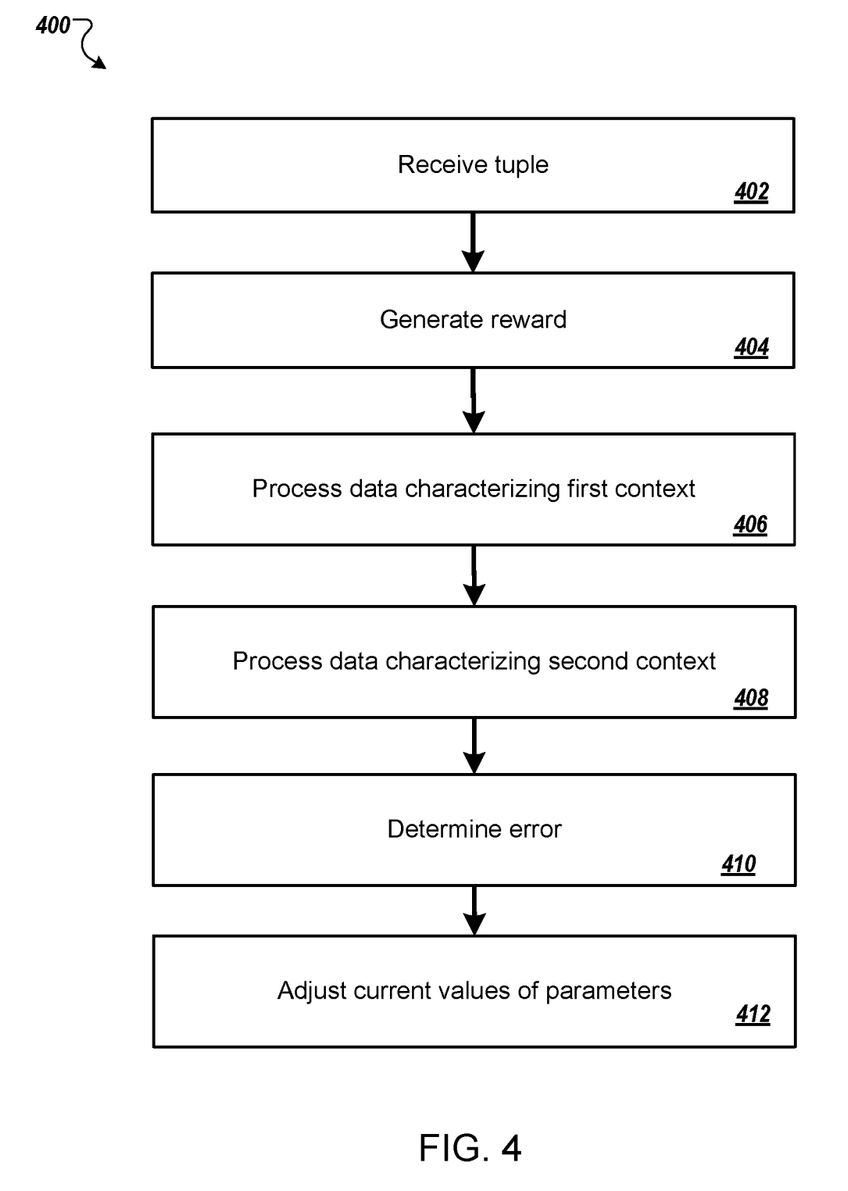
FIG. 4 is a flow diagram of an example process for training a long-term engagement machine learning model through reinforcement learning.

FIG. 4 is a flow diagram of an example process 400 for training a long-term engagement machine learning model through reinforcement learning. For convenience, the process 400 will be described as being performed by a system of one or more computers located in one or more locations. For example, a content item presentation system, e.g., the content item presentation system 100 of FIG. 1, appropriately programmed, can perform the process 400.

The system receives a tuple that includes data characterizing a first context in which a first content item was presented to a user in the presentation environment, data identifying whether the user selected the first content item, and data characterizing a second, subsequent context in which a second content item was presented to the user (step 402). Generally, the second context immediately follows the first context, i.e., the second content item is the next content item presented to the user in the environment after the first content item.

The system generates a reward based on whether the user selected the first content item that was presented when the environment was in the first state (step 404).

The manner in which the reward is generated is dependent on what kind of engagement score the machine learning model has been trained to generate.

In particular, if the machine learning model is being trained to generate to generate engagement scores that represent time-adjusted total numbers of selections of future content items, the system sets the reward to a first predetermined numeric value if the user selected the first content item and to a second, lower predetermined numeric value if the user did not select the first content item. For example, the first numeric value can be one and the second numeric value can be zero. As another example, the first numeric value can be 0.8 and the second numeric value can be 0.1.

If the machine learning model is being trained to generate engagement scores that represent a time-adjusted change in a rate with which the user selects future content items, the system sets the reward to a first value that is dependent on the predicted likelihood that the user would select the first content item as determined by the external system if the user selected the first content item and to zero if the user did not select the first content item. For example, the first value may be one minus the predicted likelihood or one divided by the predicted likelihood.

The system processes the data characterizing the first context using the long-term engagement machine learning model in accordance with current values of the parameters of the network to generate a first engagement score for the first state (step 406).

The system processes the data characterizing the second context using the long-term engagement machine learning model in accordance with current values of the parameters of the network to generate a second engagement score for the second state (step 408).

The system determines an error for the first engagement score from the reward and the second engagement score (step 410). The system can determine the error in any of a variety of ways that are appropriate for a reinforcement learning training technique.

For example, the error E may be a temporal difference learning error that satisfies:

$$E = V(s_t) - (R + \gamma V(s_{t+1})),$$

where $V(s_t)$ is the first engagement score, R is the reward, $V(s_{t+1})$ is the second engagement score, and $\gamma$ is the time discount factor.

As another example, the error E may be an interpolation between the above temporal difference error and a Monte-Carlo supervised learning error.

As yet another example, the error E may incorporate a Huber loss that enforces a cap on the magnitude of the error.

The system adjusts the current values of the parameters of the long-term engagement machine learning model using the error (step 412). For example, the system can perform an iteration of a gradient descent with backpropagation training technique to update the parameters of the model to decrease the error.

The system can perform the process 400 repeatedly on multiple different tuples to train the model to effectively generate long-term engagement scores. While each tuple describes content items presented to a single user, the multiple different tuples will generally include tuples that collectively describe content items presented to many different users. For example, the system can repeatedly perform the process 400 on tuples selected from a tuple database until convergence criteria for the training of the machine learning model are satisfied.

To ensure that the machine learning model is also trained to generate null engagement scores, some of the tuples on which the process 400 is performed include contexts in which no context item was presented to the user. For these tuples, the data characterizing the context includes the placeholder data characterizing the null content item. By including tuples in which at least one of the contexts did not have a content item presented to the user, the machine learning model is trained to generate accurate null engagement scores as well as engagement scores for actual content items.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input.

An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:
1. A system comprising:
 a long-term engagement machine learning model implemented by one or more computers, the long-term engagement machine learning model having been trained through reinforcement learning to:

receive a plurality of inputs, each input including data characterizing a respective context in which a respective content item may be presented in a presentation environment to a respective user, and process each of the plurality of inputs to generate a respective engagement score for each input that represents a predicted, time-adjusted total number of selections by the respective user of future content items that will be presented to the respective user in the presentation environment at time windows that are subsequent to a time window at which the respective content item would be presented to the user if the respective content item were to be presented in the respective context; and a subsystem configured to perform operations comprising:

receiving first data characterizing a first context in which a first content item may be presented to a first user in the presentation environment;

providing the first data as input to the long-term engagement machine learning model to obtain a first engagement score that represents a predicted, time-adjusted total number of selections by the first user of future content items presented to the first user in the presentation environment if the first content item is presented in the first context;

providing second data characterizing the first context and a null content item as input to the long-term engagement machine learning model to obtain a null engagement score that represents a predicted, time-adjusted total number of selections by the first user of future content items presented to the first user in the presentation environment if no content item is presented in the first context;

determining, based on a difference between the null engagement score and the first engagement score, a predicted impact characterizing a predicted measure of change in user engagement for the first user as a consequence of presenting the first content item in the first context; and determining, using the predicted impact, whether or not to present the first content item to the first user in the first context.

2. The system of claim 1, wherein the long-term engagement machine learning model has been trained through reinforcement learning to treat the second data as an indication that no content item is presented to the first user in the first context.

3. The system of claim 1, wherein determining whether or not to present the first content item comprises determining to present the first content item to the first user in the first context only when the predicted impact is greater than a threshold impact value.

4. The system of claim 1, the operations further comprising:

in response to determining to present the first content item, providing the first content item for presentation to the first user in the presentation environment or providing an indication to an external system that causes the external system to provide the first content item for presentation to the first user in the presentation environment.

5. The system of claim 1, wherein the long-term engagement machine learning model has been trained through reinforcement learning to determine trained values of parameters of the long-term engagement machine learning model.

6. The system of claim 1, wherein the data characterizing the first context comprises data characterizing content items previously presented to the first user in the presentation environment.

7. The system of claim 1, wherein the presentation environment is a response to a search query submitted by the user, and wherein the data characterizing the context comprises the search query.

8. The system of claim 7, wherein the data characterizing the first context comprises data characterizing content items previously presented to the first user in response to one or more search queries previously submitted by the first user.

9. The system of claim 1, wherein the data characterizing the first context comprises data characterizing a quality of the first content item.

10. The system of claim 1, wherein the data characterizing the first context comprises a predicted likelihood that the first user will select the first content item if the first content item is presented to the first user in the first context.

11. One or more non-transitory computer storage media storing instructions that when executed by one or more computers cause the one or more computers to implement:

a long-term engagement machine learning model, the long-term engagement machine learning model having been trained through reinforcement learning to:

receive a plurality of inputs, each input including data characterizing a respective context in which a respective content item may be presented in a presentation environment to a respective user, and process each of the plurality of inputs to generate a respective engagement score for each input that represents a predicted, time-adjusted total number of selections by the respective user of future content items that will be presented to the respective user in the presentation environment at time windows that are subsequent to a time window at which the respective content item would be presented to the user if the respective content item were to be presented in the respective context; and a subsystem configured to perform operations comprising:

receiving first data characterizing a first context in which a first content item may be presented to a first user in the presentation environment;

providing the first data as input to the long-term engagement machine learning model to obtain a first engagement score that represents a predicted, time-adjusted total number of selections by the first user of future content items presented to the first user in the presentation environment if the first content item is presented in the first context;

providing second data characterizing the first context and a null content item as input to the long-term engagement machine learning model to obtain a null engagement score that represents a predicted, time-adjusted total number of selections by the first user of future content items presented to the first user in the presentation environment if no content item is presented in the first context;

determining, based on a difference between the null engagement score and the first engagement score, a predicted impact characterizing a predicted measure of change in user engagement for the first user as a consequence of presenting the first content item in the first context; and determining, using the predicted impact, whether or not to present the first content item to the first user in the first context.

12. A method performed by one or more computers, the method comprising:
   receiving first data characterizing a first context in which a first content item may be presented to a first user in a presentation environment;
   providing the first data as input to a long-term engagement machine learning model to obtain a first engagement score that represents a predicted, time-adjusted total number of selections by the first user of future content items presented to the first user in the presentation environment if the first content item is presented in the first context, the long-term engagement machine learning model having been trained through reinforcement learning to:
      receive a plurality of inputs, each input including data characterizing a respective context in which a respective content item may be presented in the presentation environment to a respective user, and
      process each of the plurality of inputs to generate a respective engagement score for each input that represents a predicted, time-adjusted total number of selections by the respective user of future content items that will be presented to the respective user in the presentation environment at time windows that are subsequent to a time window at which the respective content item would be presented to the user if the respective content item were to be presented in the respective context;
   providing second data characterizing the first context and a null content item as input to the long-term engagement machine learning model to obtain a null engagement score that represents a predicted, time-adjusted total number of selections by the first user of future content items presented to the first user in the presentation environment if no content item is presented in the first context;
   determining, based on a difference between the null engagement score and the first engagement score, a predicted impact characterizing a predicted measure of change in user engagement for the first user as a consequence of presenting the first content item in the first context; and
   determining, using the predicted impact, whether or not to present the first content item to the first user in the first context.

13. The method of claim 12, wherein the long-term engagement machine learning model has been trained through reinforcement learning to treat the second data as an indication that no content item is presented to the first user in the first context.

14. The method of claim 12, wherein determining whether or not to present the first content item comprises determining to present the first content item to the first user in the first context only when the predicted impact is greater than a threshold impact value.

15. The method of claim 12, further comprising:
   in response to determining to present the first content item, providing the first content item for presentation to the first user in the presentation environment or providing an indication to an external system that causes the external system to provide the first content item for presentation to the first user in the presentation environment.

16. The method of claim 12, wherein the data characterizing the first context comprises data characterizing content items previously presented to the first user in the presentation environment.

17. The method of claim 12, wherein the data characterizing the first context comprises data characterizing a quality of the first content item.

18. The method of claim 12, wherein the data characterizing the first context comprises a predicted likelihood that the first user will select the first content item if the first content item is presented to the first user in the first context.

\* \* \* \* \*